(12) United States Patent
Cho et al.

(10) Patent No.: US 7,831,778 B2
(45) Date of Patent: Nov. 9, 2010

(54) SHARED NONVOLATILE MEMORY ARCHITECTURE

(75) Inventors: Myung Rai Cho, San Jose, CA (US); Dongyun Lee, San Jose, CA (US); Alan Ruberg, Menlo Park, CA (US)

(73) Assignee: Silicon Image, Inc., Sunnyvale, CA (US)

(*) Notice: Subject to any disclaimer, the term of this patent is extended or adjusted under 35 U.S.C. 154(b) by 732 days.

(21) Appl. No.: 11/690,629

(22) Filed: Mar. 23, 2007

(65) Prior Publication Data

US 2007/0233938 A1    Oct. 4, 2007

Related U.S. Application Data

(60) Provisional application No. 60/788,401, filed on Mar. 30, 2006.

(51) Int. Cl.
  *G06F 12/00* (2006.01)
  *G06F 13/00* (2006.01)
  *G06F 13/28* (2006.01)
  *G06F 9/00* (2006.01)
  *G06F 9/24* (2006.01)
  *G06F 15/177* (2006.01)

(52) U.S. Cl. ............... 711/147; 713/1; 713/2; 711/E12.039

(58) Field of Classification Search ............... None
  See application file for complete search history.

(56) References Cited

U.S. PATENT DOCUMENTS

| | | | |
|---|---|---|---|
| 4,344,133 A | 8/1982 | Bruce, Jr. et al. | |
| 4,449,183 A | 5/1984 | Flahive et al. | |
| 4,729,091 A * | 3/1988 | Freeman et al. | 711/147 |
| 4,862,354 A | 8/1989 | Fiacconi et al. | |
| 5,142,683 A | 8/1992 | Burkhardt, Jr. et al. | |
| 5,144,314 A | 9/1992 | Malmberg et al. | |
| 5,175,853 A | 12/1992 | Kardach et al. | |
| 5,423,008 A | 6/1995 | Young et al. | |

(Continued)

FOREIGN PATENT DOCUMENTS

EP    1209563    5/2002

(Continued)

OTHER PUBLICATIONS

"8029P066EP IPRP Mailed Jan. 29, 2009 for EP Patent Application 07759902.5-2210", (Jan. 29, 2009), Whole document.

(Continued)

*Primary Examiner*—Shane M Thomas
*Assistant Examiner*—Ralph A Verderamo, III
(74) *Attorney, Agent, or Firm*—Blakely Sokoloff Taylor & Zafman

(57) ABSTRACT

A method and system that utilizes a shared nonvolatile memory for initializing multiple processing components in a device. The startup logic and configuration data for processing components within a device is stored in a single nonvolatile memory. Upon receipt of a command to initialize the device, the shared memory system copies the startup logic and configuration data from the nonvolatile memory to a volatile main memory. Then, each processing component accesses the main memory to find its startup logic and configuration data and begin executing. The shared memory system reduces the number of nonvolatile memory components used to initialize multiple processing components.

27 Claims, 4 Drawing Sheets

U.S. PATENT DOCUMENTS

| | | | |
|---|---|---|---|
| 5,438,666 A | | 8/1995 | Craft et al. |
| 5,446,841 A | | 8/1995 | Masahiro et al. |
| 5,561,784 A | | 10/1996 | Chen et al. |
| 5,764,882 A | * | 6/1998 | Shingo .................. 714/11 |
| 5,901,309 A | | 5/1999 | Hammer et al. |
| 6,002,633 A | | 12/1999 | Oppold et al. |
| 6,118,792 A | | 9/2000 | Beshai |
| 6,167,487 A | | 12/2000 | Camacho et al. |
| 6,263,390 B1 | | 7/2001 | Alasti et al. |
| 6,396,324 B1 | | 5/2002 | Hsu et al. |
| 6,665,795 B1 | * | 12/2003 | Roth et al. .................. 713/1 |
| 6,795,360 B2 | | 9/2004 | Duh et al. |
| 6,845,409 B1 | | 1/2005 | Talagala et al. |
| 7,369,453 B2 | | 5/2008 | Kim |
| 7,405,995 B2 | | 7/2008 | Ishimoto et al. |
| 7,433,263 B2 | | 10/2008 | Kim |
| 2002/0065994 A1 | | 5/2002 | Henson et al. |
| 2003/0056061 A1 | | 3/2003 | Sherman |
| 2003/0126424 A1 | * | 7/2003 | Horanzy et al. ............. 713/2 |
| 2006/0072563 A1 | * | 4/2006 | Regnier et al. ............. 370/389 |
| 2008/0074936 A1 | | 3/2008 | Kim et al. |

FOREIGN PATENT DOCUMENTS

| | | | |
|---|---|---|---|
| EP | 1209563 A2 | * | 5/2002 |

OTHER PUBLICATIONS

EPO, "8029P052EP OA Mailed Mar. 26, 2009 for EP Application No. 07759905.8-1243", (Mar. 26, 2009), Whole Document.

International Preliminary Report on Patentability mailed Oct. 9, 2008 for International Application No. PCT/US2007/065727.

TW Associate report on Taiwanese Office Action for TW Application No. 096111507 mailed Mar. 22, 2010.

SIPO of the People's Republic of China, First Office Action for Chinese Patent Application No. 200780018383.3 mailed Mar. 10, 2010.

EPO, Communication pursuant to Article 94(3) European Patent Application No. 07759902.5 mailed Jul. 8, 2010, 4 pp.

EPO, Communication Pursuant to Article 94(3) EPC for European Patent Application No. 07759901.7 mailed Jun. 30, 2009.

PCT ISR & Wo, International Search Report and Written Opinion mailed Sep. 9, 2008 for International Application No. PCT/US2007/065722 (Sep. 9, 2008), Whole Document.

USPTO, Non-final Office Action mailed Jan. 8, 2009 for U.S. Appl. No. 11/694,813, (Jan. 8, 2009), Whole Document.

USPTO, Notice of Allowance mailed May 14, 2009 for U.S. Appl. No. 11/694,813, (May 14, 2009), Whole document.

Non-final Office Action for U.S. Appl. No. 11/694,819 mailed Aug. 16, 2010.

TW Associate report on Taiwanese Office Action for TW Application No. 096111507 mailed Aug. 25, 2010.

* cited by examiner

SHARED NONVOLATILE MEMORY ARCHITECTURE

CROSS-REFERENCE TO RELATED APPLICATIONS

This application claims the benefit of U.S. Provisional Patent Application No. 60/788,401, filed Mar. 30, 2006, entitled "Integrated Multi-Port Serial Memory and Inter-Processor Communication," which is incorporated herein by reference in its entirety.

BACKGROUND

Mobile devices with multiple processing components dedicated to separate tasks are becoming increasingly common. For example, mobile phones often contain a baseband processor dedicated to handling the connection and disconnection of calls, and a separate media processor dedicated to displaying a user interface and receiving requests from a user. Such components may share a volatile main memory for use during operation, or each component may have a dedicated memory. Each component may have its own nonvolatile memory used to store startup logic and configuration data. In addition, each component may have its own proprietary interface for communication with the other components.

The cost of manufacturing a device is directly related to the number of components included within the device. Therefore, it is a common manufacturing goal to reduce or eliminate redundant components to save money. Additional components also increase the power consumption of the device, which directly affects the battery life of mobile devices. Therefore, reducing components also prolongs battery life. In addition, the number of buses and other interfaces between components increases the complexity of a device. Increased complexity contributes to the difficulty of designing and testing the device and increases the time required to bring a new product to market.

One component that can be particularly costly in a device is the nonvolatile memory used to initialize the device. Typically an EEPROM is used that can be flashed with startup logic and configuration data at the factory, sometimes referred to as flash memory. Flash memory is available in two types, NAND and NOR, referring to the predominant type of logic gates used within the flash memory for storing data. NOR flash memory is fast, having microsecond access times, while NAND flash memory is slower, typically having millisecond access times. However, this speed comes with a price, and NOR flash memory is more expensive than NAND flash memory. Device manufacturers must make a trade-off between the speed of the flash memory and its cost. Consumers typically expect fast startup times for consumer electronic devices (e.g., cellular phones and DVD players) tipping the balance in favor of using a faster flash memory, so the flash memory is often one of the more expensive components of a device. When multiple processing components are included within a device, each having its own flash memory, the cost can be substantial.

DETAILED DESCRIPTION

Figure 1:
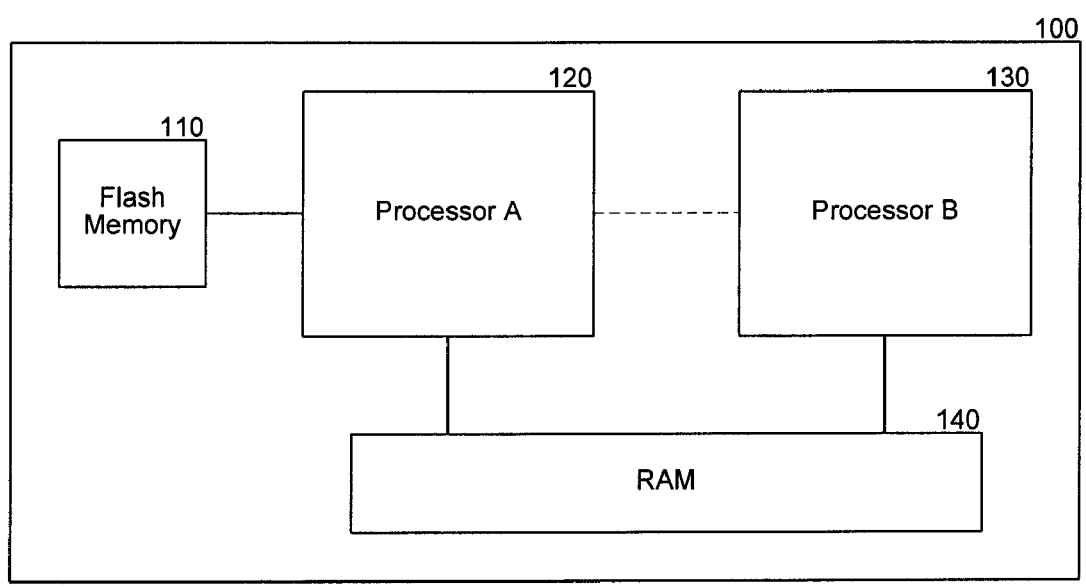
FIG. 1 is a block diagram that illustrates components of a shared memory system.

A method and system that utilizes a shared nonvolatile memory for initializing multiple processing components is provided, referred to as a shared memory system. The shared memory system reduces the number of nonvolatile memory components used to initialize multiple processing components within a device. In some embodiments, the startup logic and configuration data for processing components within a device is stored in a single nonvolatile memory. Upon receipt of a command to initialize the device, the shared memory system copies the startup logic and configuration data from the nonvolatile memory to the volatile main memory. Then, each processing component accesses the main memory to find its startup logic and configuration data and begin executing. Main memory is typically much faster than flash memory. Therefore, the movement of the startup logic from the nonvolatile memory to main memory reduces the importance of the speed of the nonvolatile memory, since it is only a factor during the initial copying. In this way, the shared memory system allows a device manufacturer to select a cheaper nonvolatile memory component without a significant impact on the startup speed of the device. Moreover, since the device manufacturer already has to design each component to access main memory during normal operation, it is not necessary to design an additional interface for accessing the nonvolatile memory when the startup logic is available from main memory. In this way, the shared memory system simplifies the design of each component, leading to less complexity and lower power consumption.

In some embodiments, the shared memory system utilizes a serial-port memory component, such as the MemoryLink architecture described in U.S. patent application Ser. No. 10/045,297, entitled "COMMUNICATIONS ARCHITECTURE FOR MEMORY-BASED DEVICES", and filed on Nov. 7, 2001, which is incorporated herein by reference. The above-referenced application describes a serial-port memory that allows multiple devices, such as the processing components described above, to access a single main memory device. The architecture includes mechanisms for accessing the memory, and for communicating events between devices to indicate the completion of operations. In some embodiments, the processing components may have a separate interface connecting them that the processing components use to synchronize their activities.

In some embodiments, the shared memory system designates one of the processing components to be a master processing component. The master processing component is the only processing component attached to the non-volatile (e.g., flash) memory component. During startup, the master processing component is responsible for copying the contents of the non-volatile memory component to the main memory component. After the master processing component has copied the contents of the non-volatile memory component, the master processing component signals the other processing components to begin their startup sequence, such as by using the signaling mechanisms described above. The master processing component also begins its startup sequence by accessing the main memory component, which contains the copied contents of the non-volatile memory component. In this way, only one processing component is designed with a separate interface to the non-volatile memory component, yet the contents of the non-volatile memory component are made available to each of the processing components.

FIG. 1 is a block diagram that illustrates components of the shared memory system, in some embodiments. A device 100 using the shared memory system comprises a flash memory component 110 or other nonvolatile memory component, a first processing component 120, at least one other processing component 130, and a main random access memory (RAM) 140 or other volatile memory component. The flash memory component 110 contains startup logic and configuration data that is stored for each of the processing components during periods when the power has been removed from the shared memory system. The first processing component 120 is configured as a master processing component and is attached to the flash memory component 110. During startup of the device 100, the first processing component 120 copies the contents of the flash memory component 110 to the random access memory 140. Each of the processing components 120 and 130 is connected to the random access memory 140. Once the first processing component 120 has copied the contents of the flash memory component 110 to the random access memory 140, each of the processing components 120 and 130 begin their startup sequence by accessing startup logic and configuration data directly from the random access memory 140. While only two processing components are depicted in FIG. 1, it will be appreciated that any number of processing or other components may be coupled to the shared memory system. The processors may also differ from each other and perform different functions. For example, in mobile applications one processor may be a baseband processor and another processor may be an application processor.

The device on which the system is implemented may include a central processing unit, memory, input devices (e.g., keyboard and pointing devices), output devices (e.g., visual displays, audio speakers), and storage devices (e.g., disk drives). The memory and storage devices are computer-readable media that may be encoded with computer-executable instructions that implement the disclosed technology, which means a computer-readable medium that contains appropriate instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various mobile operating environments that include personal computers, server computers, handheld or laptop devices, multiprocessor systems, microprocessor-based systems, programmable consumer electronics, digital cameras, network PCs, minicomputers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include hardware logic, routines, programs, objects, components, data structures, and so on that perform particular tasks or implement particular abstract data types. Typically, the functionality of the program modules may be combined or distributed as desired in various embodiments.

Figure 2:
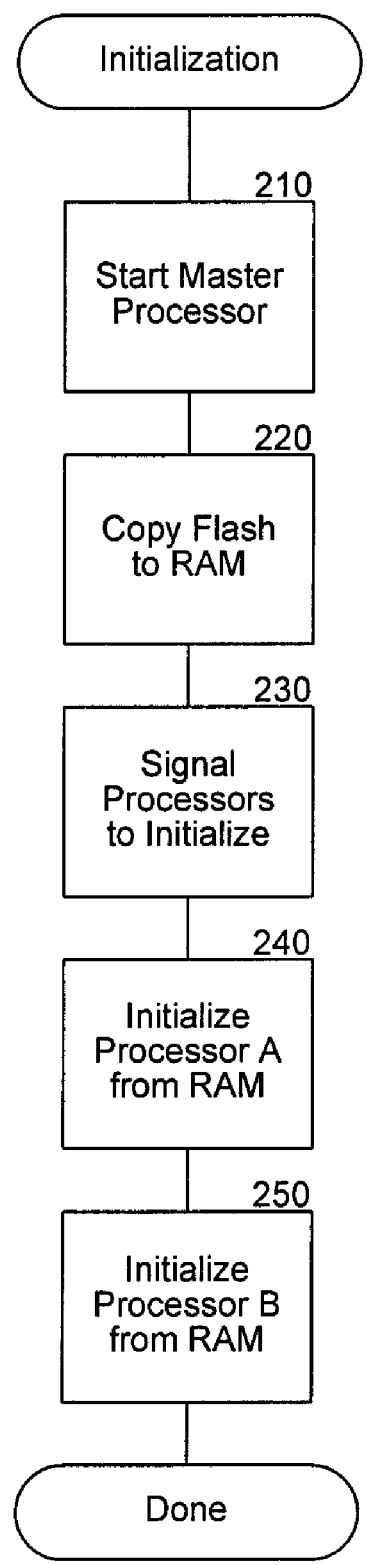
FIG. 2 is a flow diagram that illustrates the processing of a device containing the shared memory during initialization.

FIG. 2 is a flow diagram that illustrates the processing of the device during initialization, in one embodiment. Initialization occurs when power is first applied to the device or when the device performs a hard reset. In block 210, the device starts the master processor. In block 220, the device instructs the master processor to begin executing instructions from the flash memory component (or other non-volatile memory component) that instruct the master processor to copy the contents of the flash memory to the random access memory (or other volatile memory). In block 230, the device signals each of the processors to begin initialization using the random access memory component. In block 240, the first processor locates its initialization instructions within the random access memory and begins executing the initialization instructions. In block 250, the other processors locate their respective initialization instructions within the random access memory and begin executing the initialization instructions. After step 250 the device is initialized and these steps conclude.

Figure 3:
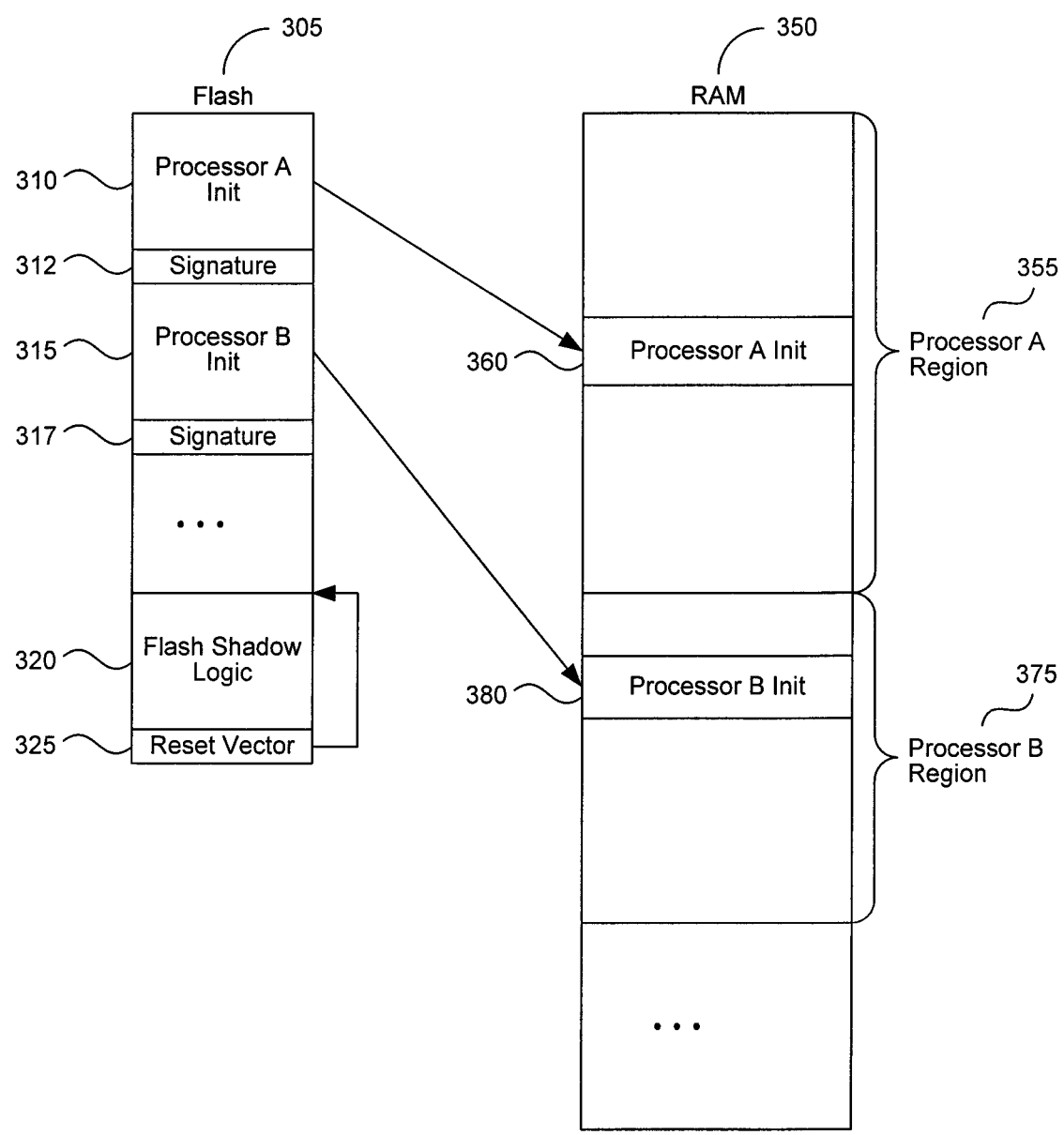
FIG. 3 is a memory diagram that illustrates the contents of a flash memory and a random access memory in the device during initialization.

FIG. 3 is a memory diagram that illustrates the contents of the flash memory and the random access memory during initialization, in one embodiment. The diagram contains a flash memory 305 and a random access memory 350. The flash memory 305 contains initialization logic 310 for a first processing component, initialization logic 315 for another processing component, flash shadow logic 320, and a boot reset vector 325. The initialization logic 310 contains the information needed by the first processing component to initialize itself. The initialization logic 310 may contain a signature 312 for validating the integrity or source of the initialization logic (described in further detail below). The initialization logic 315 contains the information needed by the second processing component to initialize itself. The initialization logic 315 may also contain a signature 317. The flash shadow logic 320 contains instructions executed by the master processing component that copy the contents of the flash memory to the random access memory. The boot reset vector 325 is a known location at which the master processing unit begins executing upon reset. The boot reset vector 325 contains a jump to the address of the flash shadow logic 320.

The random access memory 350 contains a region 355 assigned to the first processing component, and a region 375 assigned to the second processing component. The region 355 assigned to the first processing component contains the initialization logic 360 copied from the flash memory. The region 375 assigned to the second processing component contains the initialization logic 380 copies from the flash memory. Once the flash shadow logic 320 has finished copying the initialization logic 360 and 380, the flash shadow logic 320 signals each of the processing units to begin initialization using the appropriate region of memory. In some embodiments, the shadow copy logic 320 may be embedded within one of the processing components and may not be contained within the flash memory 305. In some embodiments, each region may be associated with a port on the random access memory 350. A memory architecture having multiple serial ports for accessing the memory is disclosed in the previously-referenced patent application entitled "COMMUNICATIONS ARCHITECTURE FOR MEMORY-BASED DEVICES."

In some embodiments, the shared memory system does not designate a master processing component. Rather, the shared memory system may contain dedicated hardware for copying the contents of the flash memory component to the random access memory component, such that a master processing component is not used. Alternatively, each processing component may be connected to the flash memory component and the processing components may determine which among them will copy the contents of the flash memory, such as by determining which processing unit is fastest.

In some embodiments, the shared memory system does not signal each of the processing components to start initialization. For example, the processing components may wait a predefined period of time to begin initialization that is deemed sufficient to ensure that the copying of startup logic and configuration data from flash memory to random access memory is complete. Alternatively, the processing components may poll the main memory to determine when the shared memory system has written data to a particular known final address for the initialization logic.

In some embodiments, the shared memory system copies data from the flash memory at the request of a processing component rather than at initialization. For example, one of the processing components may be able to be reset separately from the rest of the system, such as the media processor in a cellular phone, such that the processing component requests data to be copied from the flash memory after the device has been initialized. As another example, the shared memory system may periodically power down some processing components to save power when the processing components are not in use. In such circumstances, the master processing component may provide a protocol for the requesting processing component to use to request that the region of the flash memory used by the requesting processing component be copied.

In some embodiments, the initialization logic in the flash memory component contains a hash to validate the integrity of its contents. For example, a SHA or MD5 hash may be used to create a signature that is stored with the initialization logic for each processing component that is used by each processing component to validate the integrity of the initialization logic. Alternatively or additionally, the initialization logic for one or more of the processing components may be encrypted to prevent reading or tampering with the initialization logic. The processing components may contain a public key used to decrypt the copied contents of the flash memory before executing the contents. Alternatively, the designated master processing unit may be responsible for performing this type of validation.

Figure 4:
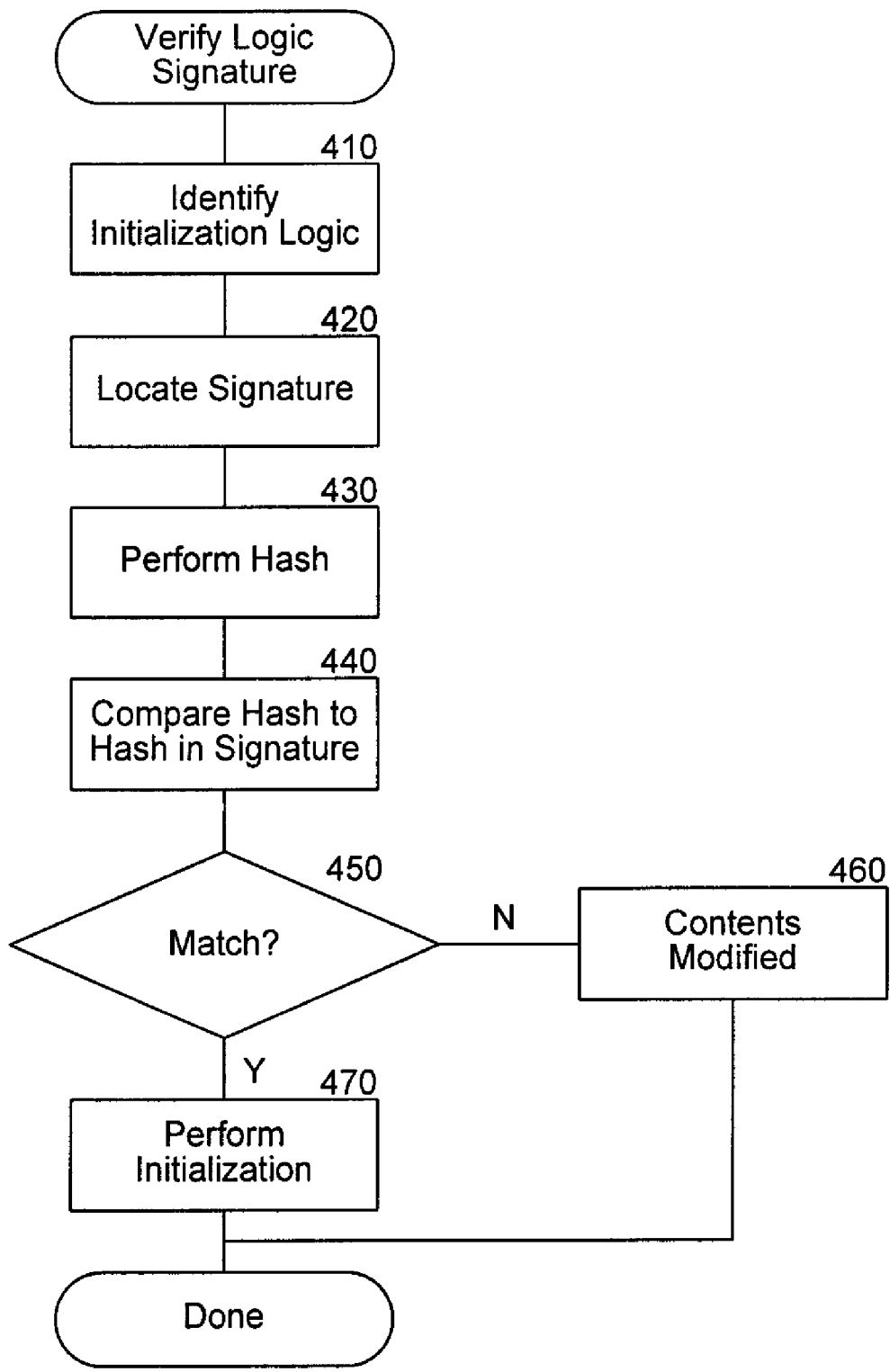
FIG. 4 is a flow diagram that illustrates the validation of initialization logic during initialization.

FIG. 4 is a flow diagram that illustrates the validation of initialization logic during initialization, in one embodiment. In block 410, a processing component identifies its initialization logic that was copied to main memory. In block 420, the processing component locates the signature associated with the initialization logic. In block 430, the processing component performs a hash of the initialization logic contents. In block 440, the processing component compares the determined hash value to the signature associated with the initialization logic. In decision block 450, if the values match, then the component continues at block 470, else the component continues at block 460. In block 460, when the values do not match the processing component determines that the contents have been modified and takes an appropriate action. For example, the processing component may signal an interrupt or halt further processing. In block 470, when the intitialization logic has not been modified, the processing component performs initialization by executing the initialization logic. After step 470, these steps conclude.

From the foregoing, it will be appreciated that specific embodiments of the shared memory system have been described herein for purposes of illustration, but that various modifications may be made without deviating from the spirit and scope of the invention. For example, although a random access memory has been described, any suitable memory device could be used. Similarly, although processing components have been described, any components that typically read information from a nonvolatile memory device, regardless of whether the nonvolatile memory device contains instructions to be executed, may benefit from the shared memory system described. Accordingly, the invention is not limited except as by the appended claims.

We claim:

1. A system for sharing a nonvolatile memory between processing components, comprising:
   a volatile memory configured to store data during the operation of the system;
   a first processing component connected to the volatile memory and configured to access initialization logic from the volatile memory, the first processing component being a master processing component for the system;
   a second processing component connected to the volatile memory and configured to access initialization logic from the volatile memory;
   a nonvolatile memory configured to store initialization logic for the first and second processing component across power cycles of the system, the initialization logic including start up and configuration data for the first processing component and the second processing component; and
   a shadow logic containing instructions executable by the first processing component to copy the initialization logic from the nonvolatile memory to the volatile memory before the first and second processing components begin initialization and to signal the second processing component to begin initialization using the initialization logic stored in the volatile memory;
   wherein the first processing component is the only processing component of the system attached with the nonvolatile memory.

2. The system of claim 1 wherein the first processing component is not the same type as the second processing component.

3. The system of claim 1 wherein the volatile memory is faster than the nonvolatile memory.

4. The system of claim 1 wherein the second processing component is further configured to request copying the initialization logic from the nonvolatile memory to the volatile memory on demand.

5. The system of claim 1 wherein the nonvolatile memory includes a boot reset vector including a location at which the first processing unit begins executing upon a reset, the boot reset vector containing a jump to the address of the shadow logic.

6. The system of claim 1 wherein the initialization logic stored in the nonvolatile memory contains a signature for validating the contents of the initialization logic, and wherein a processing component is configured to perform a hash of the initialization logic to determine whether the hash matches the signature.

7. The system of claim 6, wherein the processing component performing the hash is the first processing component.

8. The system of claim 1 wherein the initialization logic stored in the nonvolatile memory is encrypted using a private key, and wherein the first and second processing components use a public key to decrypt the initialization logic.

9. The system of claim 1, wherein the shadow logic is contained in the nonvolatile memory.

10. A method in a computer system for using information stored in a nonvolatile memory to initialize processing components in the system, the method comprising:
    receiving a request to initialize the system;
    executing by a first processing component instructions contained in a shadow logic, the first processing component being a master processing component for the computer system; and in response to the execution of instructions contained in the shadow logic by the first processing component:

copying by the first processing component initialization information from the nonvolatile memory to a volatile main memory accessible by at least some of the processing components of the system including the first processing component and the second processing component;

initializing the first processing component using at least a first portion of the initialization information stored in the volatile main memory;

signaling from the first processing component to the second processing component to direct the second processing component to initialize itself using at least a second portion of the initialization information stored in the volatile main memory;

wherein the first processing component is the only processing component attached with the nonvolatile memory.

11. The method of claim 10 wherein the first processing component is not the same type as the second processing component.

12. The method of claim 10 wherein the volatile memory is faster than the nonvolatile memory.

13. The method of claim 10 further comprising receiving a request to initialize the system based on a demand from one of the processing components.

14. The method of claim 10 further comprising copying initialization information from the nonvolatile memory to the volatile memory again after receiving an indication that a hard reset has occurred.

15. The method of claim 10 wherein the initialization information stored in the nonvolatile memory contains a signature for validating the contents of the initialization information.

16. The method of claim 10 wherein the initialization information stored in the nonvolatile memory is encrypted using a private key, and wherein the first and second processing components use a public key to decrypt the initialization information.

17. The method of claim 10 wherein the request to initialize the system is a power-on signal.

18. The method of claim 10 wherein the request to initialize the system is a reset signal.

19. A flash memory component encoded with instructions for controlling a mobile device to use information stored in a flash memory of the flash memory component to initialize multiple processing components, by a method comprising:

receiving a request to initialize the mobile device;

executing by a first processing component instructions contained in a shadow logic, the first processing component being a master processing component for a computer system; and in response to the execution of instructions contained in the shadow logic by the first processing component:

copying by the first processing component initialization information from the flash memory to a volatile memory accessible by at least some of the processing components of the system including the first processing component and the second processing component;

initializing the first processing component using at least a first portion of the initialization information stored in the volatile memory;

signaling from the first processing component to the second processing component to direct the second processing component to initialize itself using at least a second portion of the initialization information stored in the volatile memory;

wherein the first processing component is the only processing component attached with the flash memory.

20. The flash memory component of claim 19 wherein the first processing component is not the same type as the second processing component.

21. The flash memory component of claim 19 wherein the volatile memory is faster than the flash memory.

22. The flash memory component of claim 19 further comprising receiving another request to initialize the system based on a demand from one of the processing components.

23. The flash memory component of claim 19 further comprising copying initialization information from the flash memory to the volatile memory again after receiving an indication that a hard reset has occurred.

24. The flash memory component of claim 19 wherein the initialization information stored in the flash memory contains a signature for validating the contents of the initialization information.

25. The flash memory component of claim 19 wherein the initialization information stored in the flash memory is encrypted using a private key, and wherein the first and second processing components use a public key to decrypt the initialization information.

26. The flash memory component of claim 19 wherein the request to initialize the mobile device is a power-on signal.

27. The flash memory component of claim 19 wherein the request to initialize the mobile device is a reset signal.

* * * * *